United States Patent
Yang et al.

(10) Patent No.: US 9,502,982 B2
(45) Date of Patent: Nov. 22, 2016

(54) METHOD AND APPARATUS OF FREQUENCY MODULATION FOR POWER SAVING OF ADAPTIVE POWER CONVERTER

(71) Applicant: SYSTEM GENERAL CORPORATION, New Taipei (TW)

(72) Inventors: Ta-Yung Yang, Milpitas, CA (US); Jung-Sheng Chen, Kaohsiung (TW); Li Lin, Taipei (TW)

(73) Assignee: FAIRCHILD (TAIWAN) CORPORATION, Taipei (TW)

(*) Notice: Subject to any disclaimer, the term of this patent is extended or adjusted under 35 U.S.C. 154(b) by 140 days.

(21) Appl. No.: 14/340,809

(22) Filed: Jul. 25, 2014

(65) Prior Publication Data

US 2015/0036394 A1 Feb. 5, 2015

Related U.S. Application Data

(60) Provisional application No. 61/859,872, filed on Jul. 30, 2013.

(51) Int. Cl.
*H02M 3/335* (2006.01)

(52) U.S. Cl.
CPC .............................. *H02M 3/33507* (2013.01)

(58) Field of Classification Search
CPC ........... H02M 3/33507; H02M 3/335; H02M 3/33515; H02M 3/33523
USPC ....... 363/16, 21.01, 21.12, 21.15, 21.18, 34, 363/124; 323/235, 282, 284
See application file for complete search history.

(56) References Cited

U.S. PATENT DOCUMENTS

| | | | |
|---|---|---|---|
| 6,545,882 B2 | 4/2003 | Yang | |
| 6,597,159 B2 | 7/2003 | Yang | |
| 6,661,679 B1 | 12/2003 | Yang et al. | |
| 7,362,593 B2 | 4/2008 | Yang et al. | |
| 8,780,590 B2* | 7/2014 | So | H02M 3/33507 363/21.16 |
| 9,143,043 B2* | 9/2015 | Zhang | H02M 3/33546 |
| 2008/0123372 A1* | 5/2008 | Yang | H02M 3/33507 363/21.16 |
| 2010/0164460 A1* | 7/2010 | Hsiao | H02M 3/155 323/284 |
| 2013/0094247 A1* | 4/2013 | Kleinpenning | H02M 3/24 363/16 |
| 2013/0201729 A1* | 8/2013 | Ahsanuzzaman | H02M 3/33507 363/21.12 |

* cited by examiner

*Primary Examiner* — Timothy J Dole
*Assistant Examiner* — Shahzeb K Ahmad
(74) *Attorney, Agent, or Firm* — McClure, Qualey & Rodack, LLP

(57) ABSTRACT

The present invention proposes a method for controlling an adaptive power converter. The method comprises: generating an output-sense signal by sampling a reflected voltage of a transformer; receiving a feedback signal related to an output power of the adaptive power converter; generating a clock signal in response to the feedback signal and the output-sense signal; generating a switching signal for switching the transformer and regulating an output voltage of the adaptive power converter. The reflected voltage is correlated to the output voltage of the adaptive power converter. The switching signal is generated in response to the feedback signal. The frequency of the switching signal is determined by the clock signal. The frequency of the switching signal is decreased in response to a decrement of the feedback signal.

6 Claims, 5 Drawing Sheets

METHOD AND APPARATUS OF FREQUENCY MODULATION FOR POWER SAVING OF ADAPTIVE POWER CONVERTER

CROSS REFERENCE TO RELATED APPLICATIONS

This application claims the benefit of U.S. Provisional Application No. 61/859,872, filed on Jul. 30, 2013, the contents of which are incorporated herein by reference.

BACKGROUND OF THE INVENTION

1. Field of the Invention

The present invention relates to an adaptive power converter, and, more specifically, the present invention relates to a control circuit of an adaptive power converter.

2. Description of the Related Art

An output voltage of an adaptive power converter is programmable, e.g. 5V, 9V, 12V and 20V. Therefore, the adaptive power converter can fit various applications. For example, it can be used for charging various mobile devices, such as smart-phones, tablet-PCs, and notebook-PCs, etc. Whenever the output voltage switches to different output levels, the adaptive power converter should also adjust its power saving mechanic in an adaptively way to save power loss under light-load or no-load conditions. Related power saving technologies can be found in U.S. Pat. No. 6,545,882 titled "PWM controller having off-time modulation for power converter"; U.S. Pat. No. 6,597,159 titled "Pulse width modulation controller having frequency modulation for power converter"; U.S. Pat. No. 6,661,679 titled "PWM controller having adaptive off-time modulation for power saving", and U.S. Pat. No. 7,362,593 titled "Switching control circuit having off-time modulation to improve efficiency of primary-side controlled power supply".

BRIEF SUMMARY OF THE INVENTION

Thus, it is desirable to provide a method and apparatus of frequency modulation for power saving of an adaptive power converter.

An embodiment of a control circuit of an adaptive power converter is provided. The control circuit comprises a sample-hold circuit, an input circuit, an oscillation circuit, and a PWM circuit. The sample-hold circuit is coupled to a transformer to generate an output-sense signal correlated to an output voltage of the adaptive power converter. The input circuit is coupled to receive a feedback signal correlated to an output power of the adaptive power converter. The oscillation circuit generates a clock signal in response to the feedback signal and the output-sense signal. The PWM circuit generates a switching signal for switching the transformer and regulating the output voltage of the adaptive power converter. The switching signal is generated in response to the feedback signal. A frequency of the switching signal is determined by the clock signal. The frequency of the switching signal is decreased in response to the decrement of the feedback signal. The frequency of the switching signal decreases in response to an increment of the output voltage of the adaptive power converter under light-load or no-load conditions. When the output voltage of the adaptive power converter is regulated at a first output level, the frequency of the switching signal will start to decrease once the output power of the adaptive power converter falls below a first threshold. When the output voltage of the adaptive power converter is regulated at a second output level, the frequency of the switching signal will start to decrease once the output power of the adaptive power converter falls below a second threshold. The first output level is higher than the second output level, and the first threshold is higher than the second threshold. The output voltage of the adaptive power converter is programmable.

An embodiment of a method for controlling an adaptive power converter is provided. The method comprises steps of generating an output-sense signal by sampling a reflected voltage of a transformer; receiving a feedback signal related to an output power of the adaptive power converter; generating a clock signal in response to the feedback signal and the output-sense signal; and generating a switching signal for switching the transformer in response to the feedback signal and the clock signal and regulating an output voltage of the adaptive power converter. The reflected voltage is correlated to the output voltage of the adaptive power converter. The frequency of the switching signal is determined by the clock signal. The frequency of the switching signal is decreased in response to a decrement of the feedback signal.

The frequency of the switching signal decreases in response to an increment of the output voltage of the adaptive power converter under light-load or no-load conditions. When the output voltage of the adaptive power converter is regulated at a first output level, the frequency of the switching signal will start to decrease once the output power of the adaptive power converter falls below a first threshold. When the output voltage of the adaptive power converter is regulated at a second output level, the frequency of the switching signal will start to decrease once the output power of the adaptive power converter falls below a second threshold. The first output level is higher than the second output level, and the first threshold is higher than the second threshold. The output voltage of the adaptive power converter is programmable.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
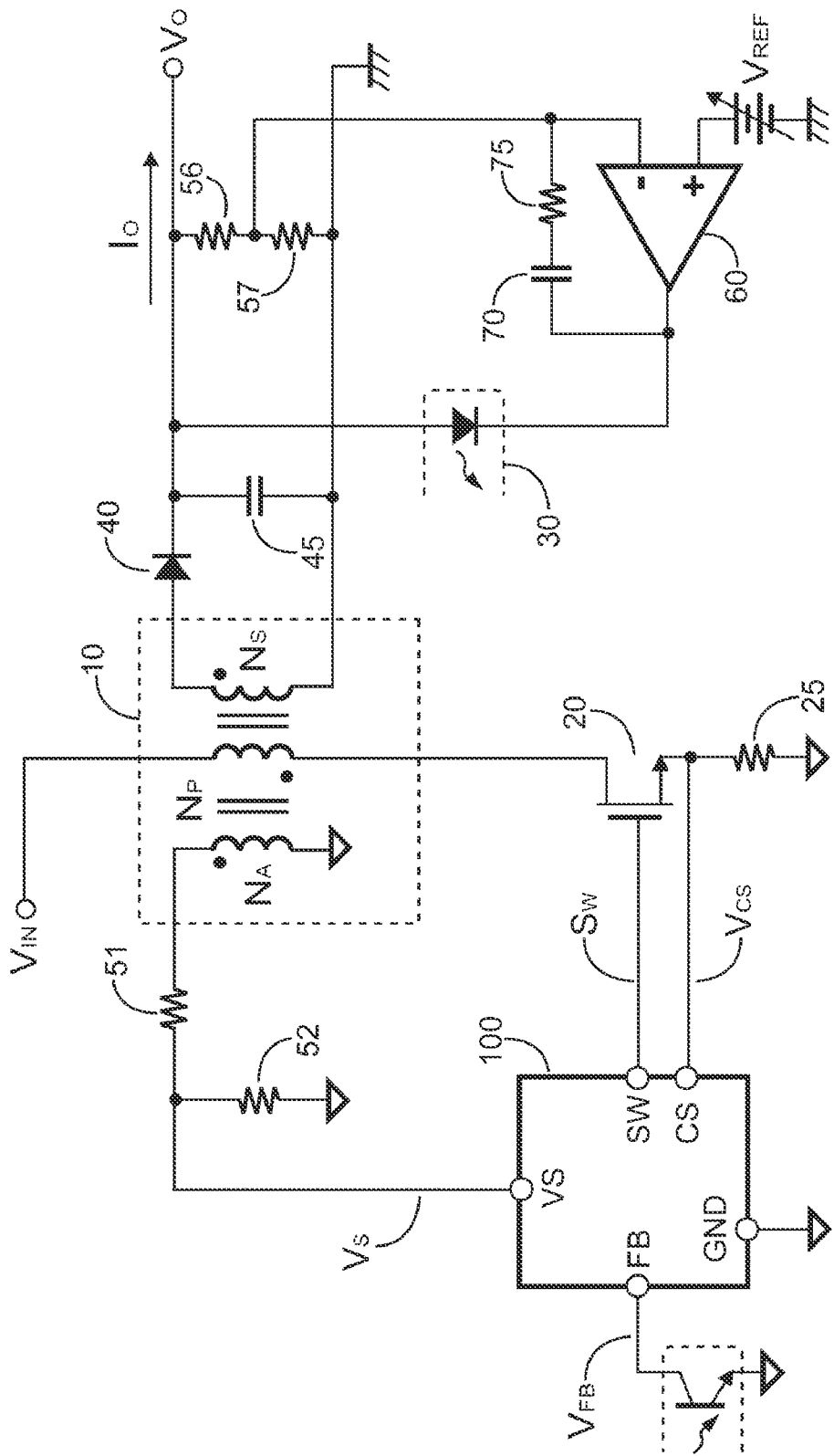
FIG. 1 shows an exemplary embodiment of an adaptive power converter according to the present invention.

FIG. 1 shows an exemplary embodiment of an adaptive power converter according to the present invention. The adaptive power converter applies flyback topology. A transformer 10 is coupled to receive an input voltage $V_{IN}$ of the adaptive power converter. A transistor 20 is coupled to switch a primary winding $N_P$ of the transformer 10. A control circuit 100 generates a switching signal $S_W$ at its terminal SW to drive the transistor 20 for regulating an output voltage $V_O$ of the adaptive power converter. When the transistor 20 is turned on, a switching current flowing through the primary winding $N_P$ of the transformer 10 will generate a switching-current signal $V_{CS}$ across a resistor 25. The switching-current signal $V_{CS}$ is supplied to a terminal CS of the control circuit 100. The switching signal $S_W$ is generated in response to a feedback signal $V_{FB}$ received at a terminal FB of the control circuit 100. The feedback signal $V_{FB}$ is correlated to the output voltage $V_O$ and an output current $I_O$ of the adaptive power converter. In detailed, the feedback signal $V_{FB}$ is correlated to the output power of the adaptive power converter. The transformer 10 further includes an auxiliary winding $N_A$. Resistors 51 and 52 are coupled to the auxiliary winding $N_A$ for generating a reflected signal $V_S$ supplied to a terminal VS of the control circuit 100. The reflected signal $V_S$ represents a reflected voltage of the transformer 10. The level of the reflected signal $V_S$ is correlated a level of the output voltage $V_O$ during a demagnetizing period of the transformer 10.

The transformer 10 further comprises a secondary winding $N_S$ for generating the output voltage $V_O$ through a rectifier 40 and a capacitor 45. An operational amplifier 60 includes a reference voltage $V_{REF}$ coupled to a positive input terminal (+) of the operational amplifier 60. The operational amplifier 60 is coupled to receive an attenuated voltage of the output voltage $V_O$, which is generated from a voltage divider formed by resistors 56 and 57, at a negative input terminal (−) of the operational amplifier 60. A capacitor 70 and a resistor 75 are coupled in series between the negative input terminal and an output terminal of the operational amplifier 60. According to the reference voltage $V_{REF}$ and the signal of the voltage divider, the output terminal of the operational amplifier 60 will drive an opto-coupler 30 to supply the feedback signal $V_{FB}$ at the terminal FB of the control circuit 100. Therefore, the control circuit 100 will regulate the output voltage $V_O$ shown in the equation (1).

$$V_O = \frac{R_{56} \times R_{57}}{R_{57}} \times V_{REF} \tag{1}$$

Figure 2:
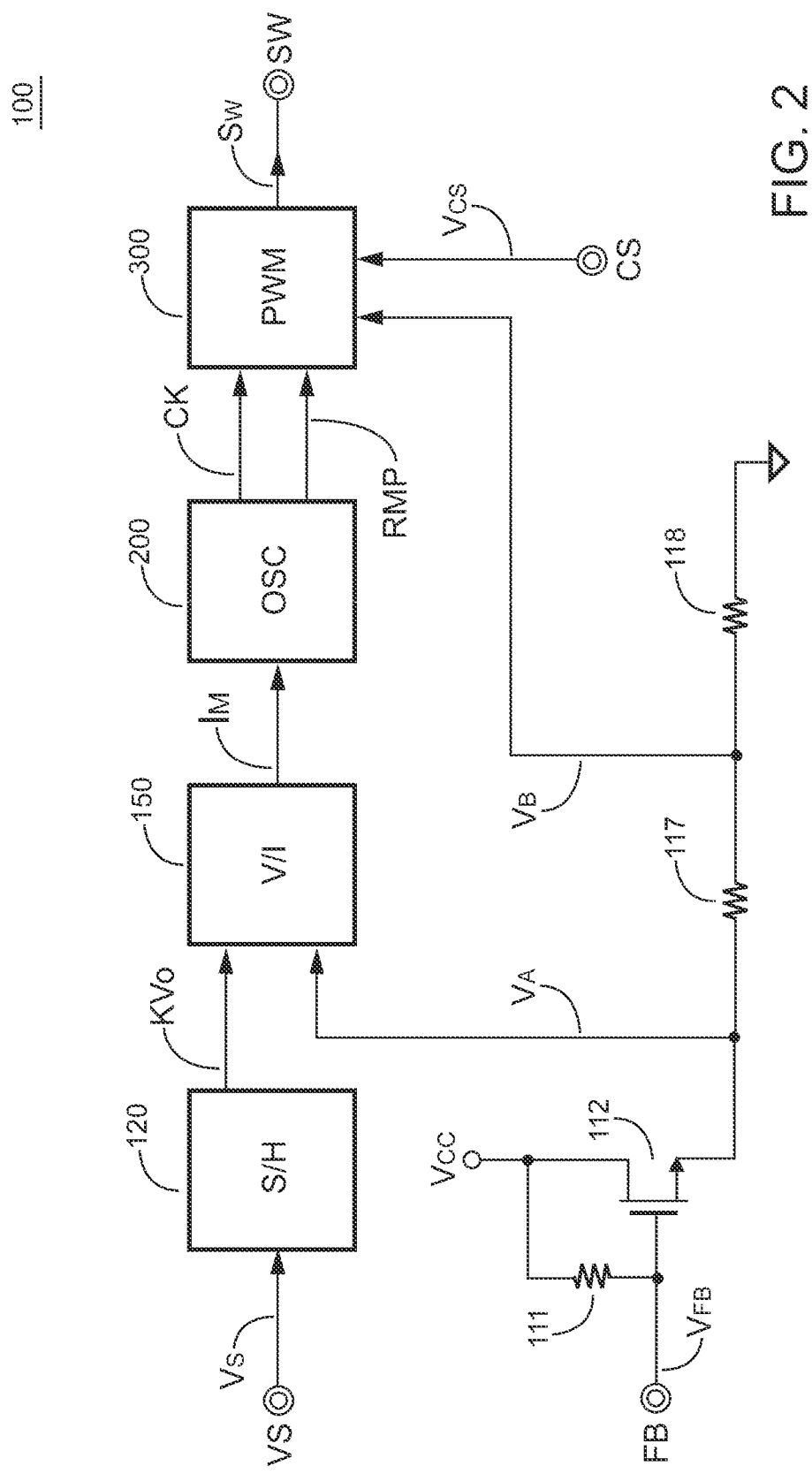
FIG. 2 shows an exemplary embodiment of a control circuit in the adaptive power converter in FIG. 1 according to the present invention.

FIG. 2 shows an exemplary embodiment of the control circuit 100 according to the present invention. The control circuit 100 comprises a sample-hold circuit (S/H) 120 coupled to receive the reflected signal $V_S$ to generate an output-sense signal $KV_O$. The output-sense signal $KV_O$ is correlated to the level of the output voltage $V_O$. The detailed skill of sampling the reflected signal $V_S$ of the transformer 10 can be found in the prior arts of U.S. Pat. No. 7,016,204 titled "Close-loop PWM controller for primary-side controlled power converters"; U.S. Pat. No. 7,151,681 titled "Multiple-sampling circuit for measuring reflected voltage and discharge time of a transformer"; U.S. Pat. No. 7,349,229 titled "Causal sampling circuit for measuring reflected voltage and demagnetizing time of transformer"; U.S. Pat. No. 7,486,528 titled "Linear-predict sampling for measuring demagnetized voltage of transform".

A transistor 112 and resistors 111, 117, and 118 develop an input circuit which receives the feedback signal VFB and generates feedback signals VA and VB in response to the feedback signal VFB. In the input circuit, the transistor 112 and the resistor 111 perform a level-shift operation to the feedback signal VFB for generating the feedback signal VA. In detailed, the level of the feedback signal VFB is shifted to the level of the feedback signal VA. The resistors 117 and 118 perform an attenuation operation to the feedback signal VA to generate the feedback signal VB. The feedback signal VA and the output-sense signal $KV_O$ are both supplied to a voltage-to-current converter (V/I) 150 for generating a modulation signal IM. The modulation signal IM is decreased in response to the decrement of the feedback signal VA. The modulation signal IM decreases in response to the increment of the output-sense signal $KV_O$. That is, the modulation signal IM decreases whenever the load of the adaptive power converter decreases. Under light-load or no-load conditions, the modulation signal IM decreases whenever the output voltage VO of the adaptive power converter increases. The modulation signal IM is further coupled to an oscillation circuit (OSC) 200 for generating a clock signal CK. The frequency of the switching signal SW is determined by the frequency of the clock signal CK. Therefore, the frequency of the switching signal SW will be decreased in response to the decrease of the modulation signal IM. In other words, the frequency of the switching signal SW will be decreased in response to the decrease of the feedback signal VFB.

The oscillation circuit 200 generates the clock signal CK and a ramp signal RMP. The clock signal CK and the ramp signal RMP are coupled to a PWM circuit (PWM) 300. The PWM circuit 300 will generate the switching signal $S_W$ according to the clock signal CK, the ramp signal RMP, the switching current signal $V_{CS}$, and the feedback signal $V_B$.

Figure 3:
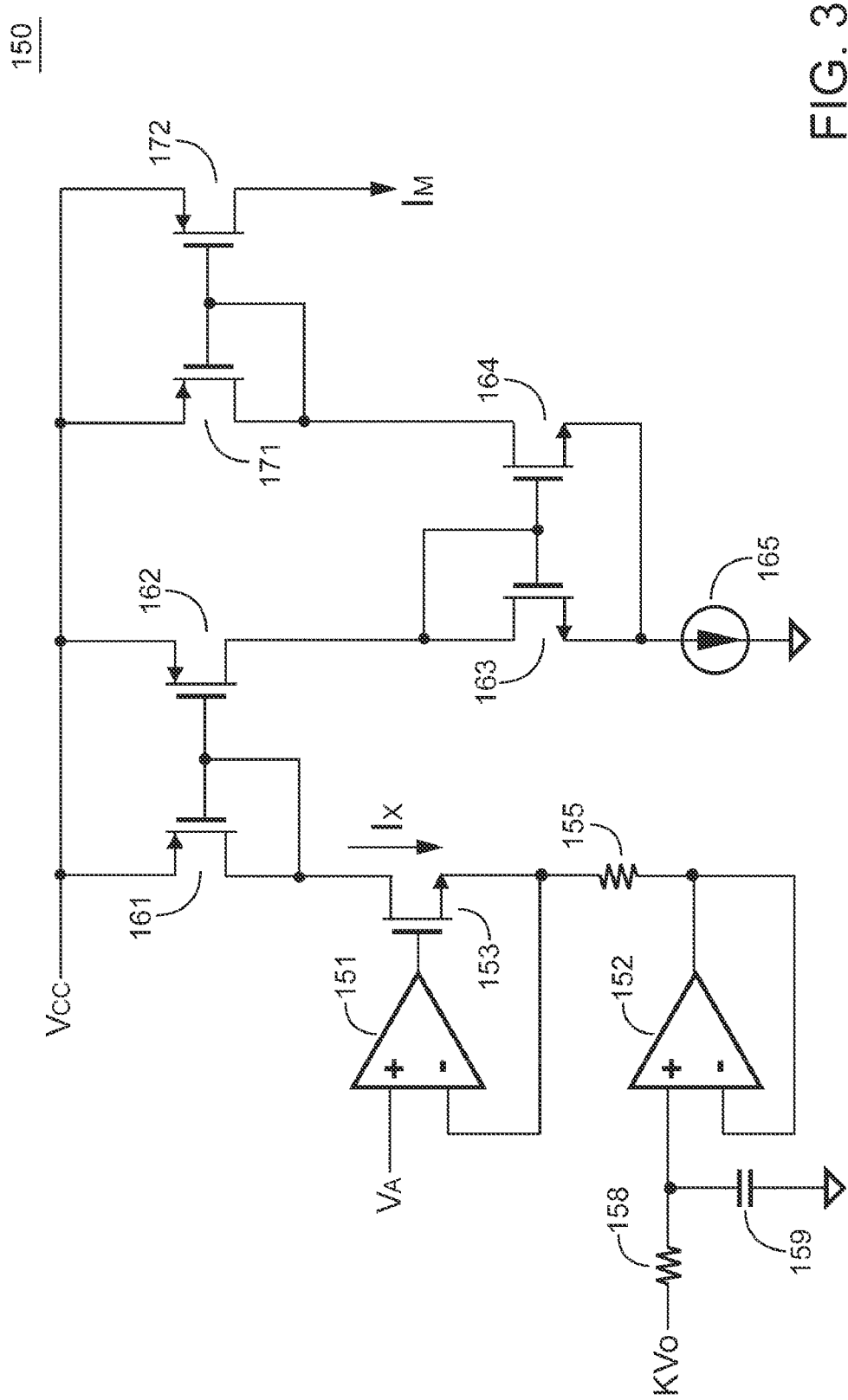
FIG. 3 shows an exemplary embodiment of a voltage-to-current converter of the control circuit in FIG. 2 according to the present invention.

FIG. 3 shows an exemplary embodiment of the voltage-to-current converter 150 according to the present invention. A positive input terminal of an operational amplifier 151 receives the feedback signal $V_A$. A joint of a resistor 158 and a capacitor 159 is coupled to a positive input terminal of an operational amplifier 152. The positive input terminal of the operational amplifier 152 receives the output-sense signal $KV_O$ via the resistor 158. The operational amplifiers 151 and 152 generate a current signal $I_X$ according to the received feedback signal $V_A$ and output-sense signal $KV_O$. The slope of the increment/decrement of the current signal $I_X$ is determined by a resistor 155. The current signal $I_X$ can be expressed as the equation (2).

$$I_X = (V_A - KV_O) \div R_{155} \tag{2}$$

The current signal $I_X$ is further coupled to current mirrors developed by transistors 161, 162, 163, 164, 171, and 172 for generating the modulation signal $I_M$ (as the equation (3)).

$$I_M = K_0 \times (V_A - KV_O) \div R_{155} \tag{3}$$

where $K_0$ is a constant determined by the ratios of current mirrors (transistors 161, 162, 163, 164, 171, and 172).

Furthermore the maximum value of the modulation signal $I_M$ is limited by a current source 165.

Figure 4:
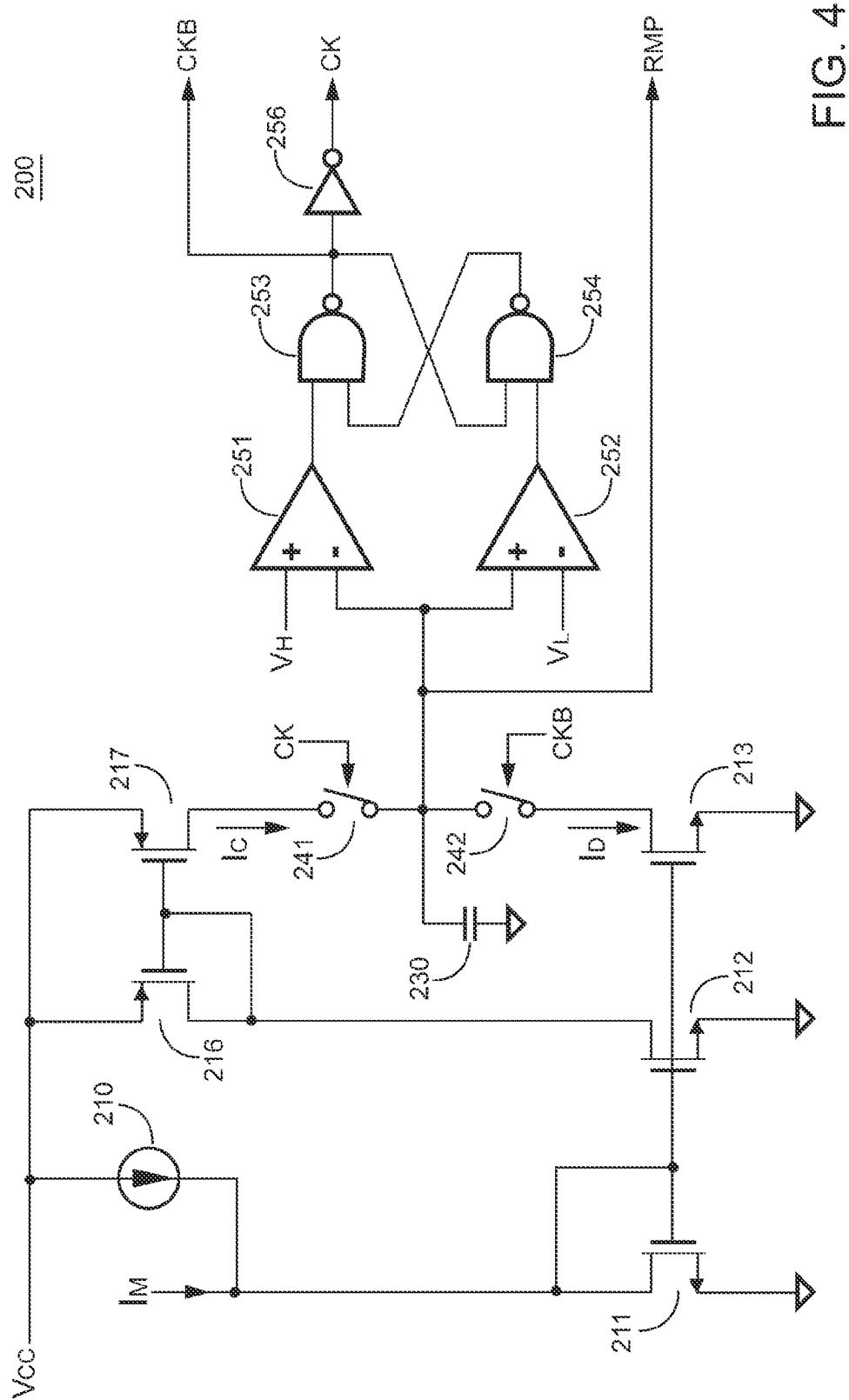
FIG. 4 shows an exemplary embodiment of an oscillation circuit of the control circuit in FIG. 2 according to the present invention.

FIG. 4 shows an exemplary embodiment of the oscillation circuit 200 according to the present invention. The modulation signal $I_M$ and a constant current source 210 are coupled to generate a charging current $I_C$ and a discharging current $I_D$ through transistors 211, 212, 213, 216, and 217.

The constant current source 210 provides a minimum value for the charging current $I_C$ and the discharging current $I_D$. The minimum value of the charging current $I_C$ and the discharging current $I_D$ determines a minimum frequency for the clock signal CK and the switching signal $S_W$.

The charging current $I_C$ and the discharging current $I_D$ are utilized to charge and discharge a capacitor 230 through switches 241 and 242 respectively. The ramp signal RMP is generated across the capacitor 230. The ramp signal RMP is further coupled to comparators 251 and 252. The comparator 251 has a trip-point voltage $V_H$. The comparator 252 has a trip-point voltage $V_L$. The level of the trip-point voltage $V_H$ is higher than that of the trip-point voltage $V_L$. NAND gates 253 and 254 form a latch circuit coupled to receive the output signals of the comparators 251 and 252. The latch circuit and an inverter 256 generate the clock signal CK and an inversed clock signal CKB. The inversed clock signal CKB is applied to control the switch 242 for the discharging the capacitor 230. The clock signal CK is used to control the switch 241 for charging the capacitor 230. The modulation signal $I_M$ will modulate the frequency of the clock signal CK. When the level of the modulation signal $I_M$ decreases, the frequency of the clock signal CK and the frequency of the switching signal $S_W$ will decrease accordingly.

Figure 5:
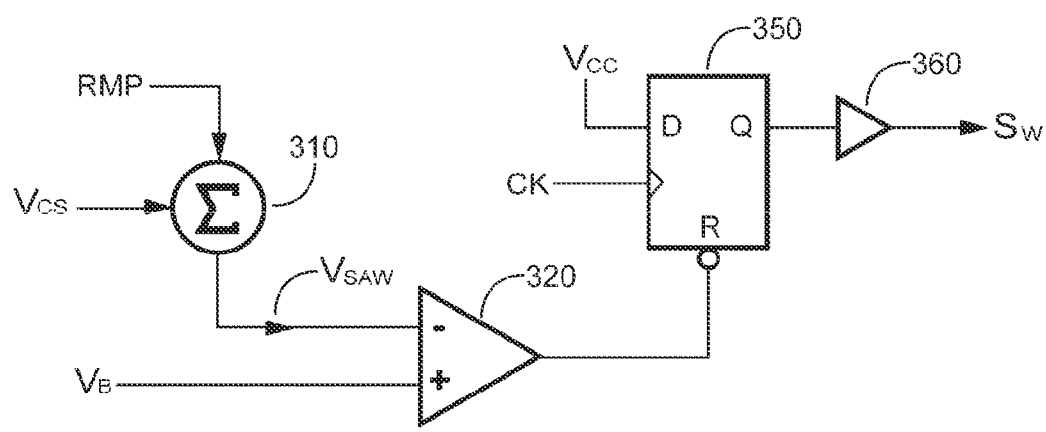
FIG. 5 shows an exemplary embodiment of a PWM circuit of the control circuit in FIG. 2 according to the present invention.

FIG. 5 shows an exemplary embodiment of a reference design of the PWM circuit 300 according to the present invention. A flip-flop 350 will cycle-by-cycle enable the switching signal $S_W$ via a buffer 360 in response to the rising edge of the clock signal CK. The switching signal $S_W$ will be cycle-by-cycle disabled by a comparator 320 when a signal $V_{SAW}$ is higher than the feedback signal $V_B$ under pulse width modulation (PWM) operation. An adder 310 adds up the ramp signal RMP and the switching current signal $V_{CS}$ to generate the signal $V_{SAW}$.

Figure 6:
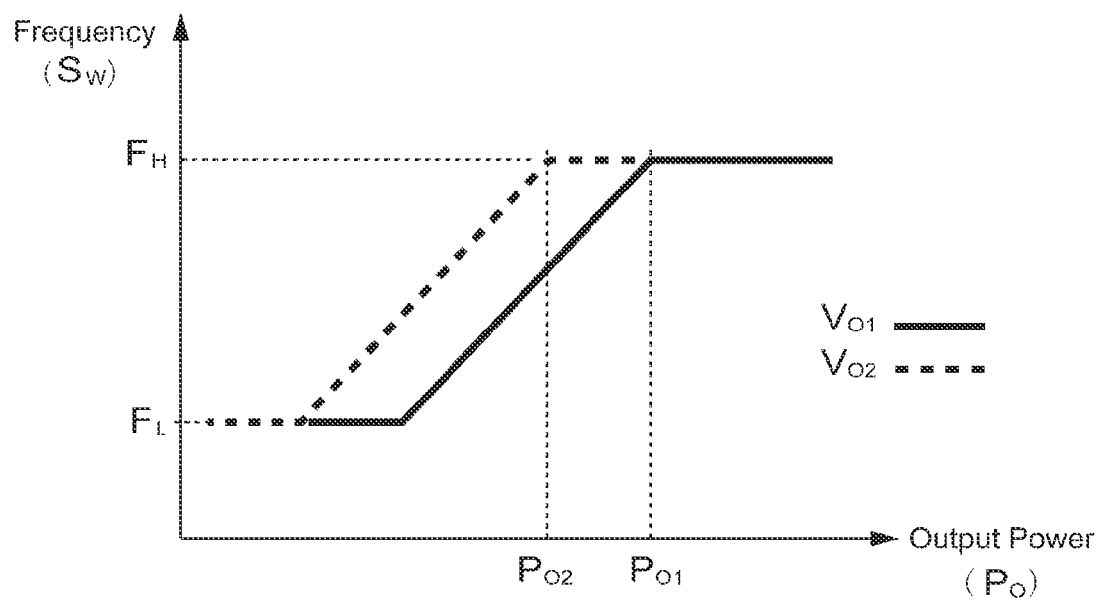
FIG. 6 shows a curve of a frequency of a switching signal versus an output power under different output voltage levels.

FIG. 6 shows the curve of the frequency of the switching signal $S_W$ versus the output power $P_O$ under different output voltage levels $V_{O1}$ and $V_{O2}$. For example, when the output voltage $V_O$ is regulated at a first output level $V_{O1}$, such as 12V, the frequency of the switching signal $S_W$ will start to decrease when the output power falls below a first threshold $P_{O1}$. The maximum frequency $F_H$ of the switching signal $S_W$ is determined by the sum of the maximum magnitude of the modulation signal $I_M$ and the magnitude of the constant current source 210. The minimum frequency $F_L$ of the switching signal $S_W$ is determined by the magnitude of the constant current source 210. When the output voltage $V_O$ is regulated at a second output level $V_{O1}$, such as 5V, the frequency of the switching signal $S_W$ will start to decrease when the output power falls below a second threshold $P_{O2}$. The first output level $V_{O1}$ is higher than the second output level $V_{O1}$. The first threshold $P_{O1}$ is higher than the second threshold $P_{O2}$.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit of an adaptive power converter, comprising:
    a sample-hold circuit, coupled to a transformer to generate an output-sense signal correlated to an output voltage of said adaptive power converter;
    an input circuit, coupled to receive a feedback signal correlated to an output power of said adaptive power converter;
    an oscillation circuit, generating a clock signal in response to said feedback signal and said output-sense signal; and
    a PWM circuit, generating a switching signal for switching said transformer and regulating said output voltage of said adaptive power converter,
    wherein said switching signal is generated in response to said feedback signal,
    wherein a frequency of said switching signal is determined by said clock signal, and said frequency of said switching signal is decreased in response to the decrement of said feedback signal,
    wherein said output voltage of said adaptive power converter is programmable,
    wherein when said output voltage of said adaptive power converter is regulated at a first output level, said frequency of said switching signal will start to decrease from a maximum frequency once said output power of said adaptive power converter falls below a first threshold,
    wherein when said output voltage of said adaptive power converter is regulated at a second output level, said frequency of said switching signal will start to decrease from said maximum frequency once said output power of said adaptive power converter falls below a second threshold, and
    wherein the first threshold is different from the second threshold.

2. The control circuit as claimed in claim 1, wherein said frequency of said switching signal decreases in response to an increment of said output voltage of said adaptive power converter under light-load or no-load conditions.

3. The control circuit as claimed in claim 1, wherein said first output level is higher than the second output level, and said first threshold is higher than said second threshold.

4. A method for controlling an adaptive power converter, comprising:
    generating an output-sense signal by sampling a reflected voltage of a transformer;
    receiving a feedback signal related to an output power of said adaptive power converter;
    generating a clock signal in response to said feedback signal and said output-sense signal; and
    generating a switching signal for switching said transformer in response to said feedback signal and said clock signal and regulating an output voltage of said adaptive power converter,
    wherein said reflected voltage is correlated to said output voltage of said adaptive power converter,
    wherein said frequency of said switching signal is determined by said clock signal, and said frequency of said switching signal is decreased in response to a decrement of said feedback signal, and
    wherein said output voltage of said adaptive power converter is programmable,
    wherein when said output voltage of said adaptive power converter is regulated at a first output level, said frequency of said switching signal will start to decrease from a maximum frequency once said output power of said adaptive power converter falls below a first threshold,
    wherein when said output voltage of said adaptive power converter is regulated at a second output level, said frequency of said switching signal will start to decrease from said maximum frequency once said output power of said adaptive power converter falls below a second threshold, and wherein the first threshold is different from the second threshold.

5. The method as claimed in claim 4, wherein said frequency of said switching signal decreases in response to an increment of said output voltage of said adaptive power converter under light-load or no-load conditions.

6. The method as claimed in claim 4, wherein said first output level is higher than the second output level, and said first threshold is higher than said second threshold.

* * * * *